United States Patent [19]

Younes

[11] 4,444,969

[45] Apr. 24, 1984

[54] FIRE RETARDANT COPOLYMER FROM BIS(HYDROCARBYL)VINYL PHOSPHONATE

[75] Inventor: Usama E. Younes, Newtown Square, Pa.

[73] Assignee: Atlantic Richfield Company, Los Angeles, Calif.

[21] Appl. No.: 410,742

[22] Filed: Aug. 23, 1982

[51] Int. Cl.$^3$ ........................ C08F 26/06; C08F 30/02
[52] U.S. Cl. .................................... 526/262; 526/275; 526/278
[58] Field of Search ........................ 526/262, 275, 278

[56] References Cited

U.S. PATENT DOCUMENTS 4,276,344   6/1981   Varma et al. ........................ 526/262

Primary Examiner—Harold D. Anderson
Attorney, Agent, or Firm—Dennis M. Kozak

[57] ABSTRACT

Copolymers of a mono vinyl-substituted aryl hydrocarbon monomer, an imide derivative of an unsaturated cyclic anhydride and a bis(hydrocarbyl) vinylphosphonate are useful as fire retardant additives.

10 Claims, No Drawings

FIRE RETARDANT COPOLYMER FROM BIS(HYDROCARBYL)VINYL PHOSPHONATE

This invention relates to fire retardant phosphorus-containing polymers.

More specifically this invention relates to a fire retardant, solid copolymer of a monovinyl-substituted aryl hydrocarbon monomer, an imide derivative of an unsaturated cyclic anhydride and, a bis(hydrocarbyl) vinylphosphonate.

Much work has been done related to phosphorus-containing polymers. Research in recent years has been directed increasingly toward the employment of phosphorus monomers having pentavalent phosphorus linked directly to a polymerizable vinyl group.

The present invention furthers this research effort by the discovery of a novel fire-retardant copolymer which utilizes this type of phosphorus monomer in the polymer backbone.

According to the invention there is provided a solid copolymer comprising: (1) a bis(hydrocarbyl) vinylphosphonate having the formula:

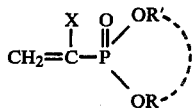

wherein X is selected from the group consisting of hydrogen, halogen, cyano, aryl, $C_1$–$C_{18}$ alkyl, alkenyl, cycloalkyl, cycloalkenyl, and

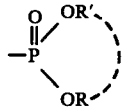

wherein R and R' hydrocarbyl and hydrocarbyl groups with substituents which do not interfere with the polymerization of the vinylphosponate, the hydrocarbyl groups and substituted hydrocarbyl groups consisting essentially of hydrogen and carbon and containing up to about 18 carbon atoms inclusive with the proviso that R and R' may be the same, different or conjoint; (2) a monovinyl substituted aryl hydrocarbon monomer containing 8 to 20 carbon atoms; and, (3) an imide derivative of an unsaturated cyclic anhydride.

Further, the monomers employed to produce the copolymers of this invention when polymerized, yield alternating copolymers which are represented by the general formula:

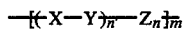

wherein $(X-Y)_{n'}$ represents a copolymer of a monovinyl substituted aryl hydrocarbon monomer and an imide derivative of an unsaturated cyclic anhydride, such as for example, poly(styrene comaleimide) copolymer; Z represents the vinyl phosphonate segment; each n separately represents an integer equal to or greater than 1; each n' separately represents an integer equal to or greater than 5; and m represents an integer equal to or greater than 1, preferably 3 or greater.

The type of bis(hydrocarbyl) vinylphosphonate intended to be used in forming the copolymer of the present invention has the structure:

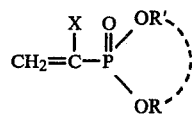

wherein X is selected from the group consisting of hydrogen, halogen, cyano, aryl, such as phenyl, $C_1$–$C_{18}$ alkyl and

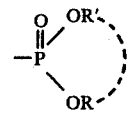

wherein R and R' are hydrocarbyl and substituted hydrocarbyl groups consisting essentially of hydrogen and carbon and containing up to about 18 carbon atoms inclusive with the proviso that R and R' may be the same, different or conjoint, i.e., R and R' may form one single radical.

The use, in this disclosure, of the expression, "hydrocarbyl" and "substituted hydrocarbyl" groups refers to the radicals obtained upon the removal of a hydrogen from a hydrocarbon or substituted hydrocarbon group which may be either an aliphatic or aromatic group. These hydrocarbyl groups may be substituted with any non-interfering groups, i.e. with any group which does not interfere with the polymerization of the bis(hydrocarbyl) vinylphosphonate. Such substituent groups include, for example, chloro, bromo, fluoro, nitro, hydroxy, sulfone, ethoxy, methoxy, nitrile, ether, ester and keto groups and the like.

Illustrative of such groups as are represented by R and R are alkyl or alkenyl groups, such as methyl, ethyl, propyl, butyl, pentyl, hexyl, nonyl, pentenyl, and hexenyl groups and all of their respective isomers, cycloalkyl or cycloalkenyl groups, such as cyclopropyl, cyclobutyl, cyclopentyl, cyclohexyl and cyclohexenyl groups and the like; while typical aryl groups represented by R and R include phenyl, benzyl, phenethyl, tolyl and naphthyl groups and the like.

Representative of the above depicted bis(hydrocarbyl) vinyl phosphonates which may be used in preparing the fire retardant copolymers of this invention are: bis(beta-chloroethyl) vinylphosphonate; bis(beta-chloropropyl) vinylphosphonate; bis(beta-chloroethyl) 1-methylvinylphosphonate; bis(beta-chloroethyl) 1-cyanovinylphosphonate; bis(beta-chloroethyl) 1-chlorovinylphosphonate; bis(betachloroethyl) 1-phenylvinylphosphonate; dimethyl vinylphosphonate; diethyl vinylphosphonate; bis(omega-chlorobutyl) vinylphosphonate; di-n-butyl vinylphosphonate; diisobutyl vinylphosphonate bis(2-Chloroisopropyl) 1-methylvinylphosphonate; diphenyl vinylphosphonate; and Bis(2,3-dibromopropyl) vinylphosphonate. The bis(hydrocarbyl) vinylphosphonate will be employed in an amount within the range of from about 0.5 to about 25 percent by weight of the copolymer.

Any suitable monovinyl-substituted aryl hydrocarbon monomer containing 8 to 20 carbon atoms can be employed to produce the copolymers of this invention. The monovinyl-substituted aryl hydrocarbon monomer will be employed in an amount within the range of from about 30 to about 90 percent by weight of the copolymer.

Particularly suitable monomers include: styrene, alpha-methyl styrene, the nuclear methyl styrenes, ethyl styrene, isopropyl styrene, tert-butyl styrene, chlorostyrenes, dichlorostyrenes, bromostyrenes, dibromostyrenes, vinylnaphthalene, and the like. Styrene is the preferred monomer.

Any suitable imide derivative of an unsaturated cyclic anhydride can be employed to produce the copolymer of this invention. The imide derivative will be employed in an amount within the range of from about 3 to about 70 percent weight of copolymer.

The type of imide derivative of unsaturated cyclic anhydride intended to be used in forming the copolymer of the present invention has the structure:

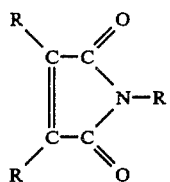

wherein each R separately represents hydrogen, a $C_1$ to $C_{20}$ alkyl group, phenyl or a substituted phenyl group, and a cycloalkyl or substituted cycloalkyl group.

Representative of the above depicted imide derivatives of unsaturated cyclic anhydrides which may be used in preparing the fire retardant copolymer of this invention are: maleimide; N-methyl maleimide; N-phenyl maleimide; N-bromophenyl maleimide; N-tribromophenyl maleimide; citraconimide; N-ethyl citraconimide; N-phenyl citraconimide; N-dibromophenyl citraconimide; α-butyl maleimide; α-phenyl maleimide; α-phenyl N-phenyl maleimide; α,α'-dimethyl maleimide; α,α'-dimethyl N phenyl maleimide; αmethyl α'phenyl maleimide; and the like.

Methods for the preparation of the above depicted imide derivatives are known. The imide derivatives employed in the examples of this invention were prepared according to the procedure taught in U.S. Pat. No. 3,431,276 (Example 19) to Eric Nield, incorporated herein by reference.

The copolymers of this invention can be produced using any suitable method of polymerization such as the method described in the following examples which serve to further illustrate the production of copolymers of this invention.

EXAMPLE 1

This example demonstrates the preparation of a copolymer of this invention.

A one gallon reactor was charged with 108 g styrene, 180 g N-phenyl maleimide and 480 g [bis(beta chloroethyl) vinylphosphonate] designated FYROL® Bis-Beta, commercially available from Stauffer Chemical Company, Specialty Chemical Division. The contents of the reactor were heated to 70° C. at which time 0.24 ml of di-t-butyl diperoxyazelate initiator (Lupersol 99) was added and the contents were heated to 115° C. The polymerization was allowed to proceed for 105 minutes. Polymerization was terminated by adding about 5 g of BHT in tetrahydrofuran (THF) solution. The resulting polymer was recovered by precipitation from methanol, filtered, washed with hexane and methanol, then dried under vacuum at 50° C.

The resulting solid polymer was found to have a weight average molecular weight (Mw) of 287,000, and was found by elemental analysis to contain 38% styrene, 52% N-phenyl maleimide and 10% [bis(beta chloroethyl) vinylphosphonate]. The polymer was melt extruded at 240° C. and exhibited a glass transition temperature of 210° C. and a Underwriters Laboratories UL-94 V-2 characteristic.

EXAMPLE 2

This example demonstrates the preparation of another copolymer of this invention.

A one pint citrate bottle was charged with 45.8 g styrene, 18.19 g N-phenyl maleimide, 44 g [bis(beta chloroethyl) vinylphosphonate] and 0.0883 g benzoyl peroxide. The polymerization was carried out in a bottle polymerizer at 90° C. for 18 hours. The product was then dissolved in THF and the polymer recovered by precipitation into methanol.

The resulting solid copolymer was found by elemental analysis to contain 41% N-phenyl maleimide, 12% [bis(beta chloroethyl) vinylphosphonate] and 47% styrene. The copolymer was tested and found to exhibit a UL-94 V-O characteristic, a Mw of 232,000 and a glass transition temperature of 173° C.

EXAMPLE 3

This example demonstrates the preparation of another copolymer of this invention.

A one pint citrate bottle was charged with 10.4 g styrene, 9.7 g maleimide, 11.7 g [bis(beta chloroethyl) vinylphosphonate] and 0.0303 g benzoyl peroxide. The polymerization was then carried out in a bottle polymerizer at 90° C. for 18 hours. The product was dissolved in THF and the polymer recovered by precipitation into methanol.

The resulting solid copolymer was found to contain 41% maleimide, 5.3% [bis(beta chloroethyl) vinylphosphonate] and 53.7% styrene. The copolymer exhibited a glass transition temperature of 228° C. and a UL 94 V-O characteristic.

The above examples demonstrate that the copolymers of this invention exhibit excellent fire retardant characteristics. As such, the copolymers of this invention are useful as fire retardant additives, and as coatings having fire retardant properties.

It will be evident from the foregoing that various modifications can be made to this invention. Such, however, are considered within the scope of this invention.

What is claimed is:

1. A solid copolymer comprising recurring segments from: (1) a bis(hydrocarbyl) vinylphosphonate having the formula:

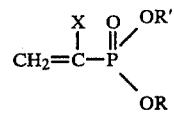

wherein X is selected from the group consisting of hydrogen, halogen, cyano, aryl, $C_1$–$C_{18}$ alkyl, alkenyl, cycloalkyl, cyclo alkenyl, and

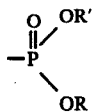

wherein R and R' hydrocarbyl and hydrocarbyl groups with substituents which do not interfere with the polymerization of the vinylphosphonate, the hydrocarbyl groups and substituted hydrocarbyl groups consisting essentially of hydrogen and carbon and containing up to about 18 carbon atoms inclusive with the proviso that R and R' may be the same, different or conjoint; (2) a monovinyl substituted aryl hydrocarbon monomer containing 8 to 20 carbon atoms; and, (3) an imide derivative of an unsaturated cyclic anhydride having the formula:

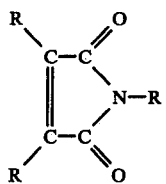

wherein each R separately represents hydrogen, a $C_1$ to $C_{20}$ alkyl group, a phenyl or a substituted phenyl group, or a cycloalkyl or substituted cycloalkyl group.

2. The solid copolymer of claim 1 in which said monovinyl substituted aryl hydrocarbon monomer is present in an amount within the range of from about 30 to about 90 percent by weight of the copolymer.

3. The solid copolymer of claim 1 in which said monovinyl substituted aryl hydrocarbon monomer is styrene.

4. The solid copolymer of claim 1 in which said imide derivative of an unsaturated cyclic anhydride is present in an amount within the range of from about 3 to about 70 percent by weight of the copolymer.

5. The solid copolymer of claim 1 in which said imide derivative of an unsaturated cyclic anhydride is maleimide.

6. The solid copolymer of claim 1 in which said imide derivative of an unsaturated cyclic anhydride is N-phenyl maleimide.

7. The solid copolymer of claim 1 in which said bis (hydrocarbyl) vinylphosphonate is present in an amount within the range of from about 0.5 to about 25 percent by weight of the copolymer.

8. The solid copolymer of claim 1 in the form of a molded article.

9. A fire retardant additive for thermoplastics consisting essentially of the solid copolymer of claim 1.

10. An alternating solid copolymer represented by the general formula:

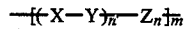

wherein $(X-Y)_{n'}$ represents a copolymer of a monovinyl substituted aryl hydrocarbon monomer and an imide derivative of an unsaturated cyclic anhydride; Z represents a vinyl phosphonate segment; each n separately represents an integer equal to or greater than 1, each n' separately represents an integer equal to or greater than 5; and, m represents an integer equal to or greater than 1.

* * * * *